United States Patent
Zhang et al.

(10) Patent No.: US 11,938,635 B2
(45) Date of Patent: Mar. 26, 2024

(54) MOTION CONTROL METHOD, ROBOT CONTROLLER AND COMPUTER READABLE STORAGE MEDIUM

(71) Applicant: UBTECH ROBOTICS CORP LTD, Shenzhen (CN)

(72) Inventors: Zhihao Zhang, Shenzhen (CN); Yizhang Liu, Shenzhen (CN); Jinliang Chen, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 264 days.

(21) Appl. No.: 17/702,819

(22) Filed: Mar. 24, 2022

(65) Prior Publication Data
US 2022/0324106 A1   Oct. 13, 2022

Related U.S. Application Data

(63) Continuation of application No. PCT/CN2021/131893, filed on Nov. 19, 2021.

(30) Foreign Application Priority Data

Mar. 31, 2021   (CN) .......................... 202110349082.0

(51) Int. Cl.
B25J 9/16   (2006.01)
(52) U.S. Cl.
CPC ........... B25J 9/1664 (2013.01); B25J 9/1607 (2013.01)
(58) Field of Classification Search
CPC .............................. B25J 9/1664; B25J 9/1607
See application file for complete search history.

(56) References Cited

U.S. PATENT DOCUMENTS

| | | | |
|---|---|---|---|
| 2007/0083290 A1* | 4/2007 | Nagasaka | B25J 9/1671 318/568.11 |
| 2008/0234864 A1* | 9/2008 | Sugiura | B25J 9/1666 700/255 |

(Continued)

FOREIGN PATENT DOCUMENTS

| | | |
|---|---|---|
| CN | 104097206 A | 10/2014 |
| CN | 108897220 A | 11/2018 |
| CN | 111538949 A | 8/2020 |

OTHER PUBLICATIONS

Gienger et al, "Task-oriented whole body motion for humanoid robots", 2005, IEEE-RAS, International Conference on Humanoid Robots, Honda Research Institute Europe GmbH https://www.honda-ri.de/, pp. 1-8 (Year: 2005).*

(Continued)

*Primary Examiner* — Jaime Figueroa
*Assistant Examiner* — Mohamad O El Sayah

(57) ABSTRACT

A motion control method, a robot controller, and a computer readable storage medium are provided. The method includes: calculating an inverse Jacobian matrix of a whole-body generalized coordinate vector at a current time relative to an actual task space vector of a humanoid robot; calculating a target generalized coordinate vector corresponding to a to-be-executed task space vector at a current moment by combining an actual task space vector and the to-be-executed task space vector into a null space of the inverse Jacobian matrix according to preset position constraint(s) corresponding to the whole-body generalized coordinate vector; and controlling a motion state of the humanoid robot according to the target generalized coordinate vector. In this manner, the motion of the humanoid robot is optimized as a whole to achieve the purpose of controlling the humanoid robot to avoid the limits of the motion of joints.

20 Claims, 7 Drawing Sheets

Obtain a whole-body generalized coordinate vector, an actual task space vector and a to-be-executed task space vector of a humanoid robot at a current moment — S210

Calculate an inverse Jacobian matrix of the whole-body generalized coordinate vector relative to the actual task space vector based on the waist posture vector and the robotic arm posture vector — S220

Calculate a target generalized coordinate vector corresponding to the to-be-executed task space vector by combining the actual task space vector and the to-be-executed task space vector into a null space of the inverse Jacobian matrix according to preset position constraint(s) corresponding to the whole-body generalized coordinate vector — S230

Control a motion state of the humanoid robot according to the target generalized coordinate vector — S240

(56) References Cited

U.S. PATENT DOCUMENTS

| | | | |
|---|---|---|---|
| 2011/0040405 A1* | 2/2011 | Lim | B25J 9/1664 700/245 |
| 2011/0066283 A1* | 3/2011 | Hammam | B62D 57/032 700/250 |
| 2011/0106306 A1* | 5/2011 | Kim | B25J 9/1664 901/1 |
| 2012/0095598 A1* | 4/2012 | Nagasaka | B25J 9/1607 700/260 |
| 2013/0079930 A1* | 3/2013 | Mistry | B25J 9/1643 901/15 |
| 2013/0144441 A1* | 6/2013 | Kanazawa | B25J 9/1607 700/263 |
| 2019/0056422 A1* | 2/2019 | Park | G01P 13/00 |
| 2021/0165375 A1* | 6/2021 | Zhao | G05B 13/048 |
| 2021/0299860 A1* | 9/2021 | Ren | B25J 13/088 |

OTHER PUBLICATIONS

Liu et al, "Active balance of humanoid movement based on dynamic task-prior system", 2017, SAGE, International Journal of Robotic Systems, May-Jun. 2017, pp. 1-13 (Year: 2017).*
ISR for PCT/CN2021/131893.
Written opinions of ISA for PCT/CN2021/131893.

* cited by examiner

MOTION CONTROL METHOD, ROBOT CONTROLLER AND COMPUTER READABLE STORAGE MEDIUM

CROSS REFERENCE TO RELATED APPLICATIONS

The present disclosure is a continuation-application of International Application PCT/CN2021/131893, with an international filing date of Nov. 19, 2021, which claims foreign priority of Chinese Patent Application No. 202110349082.0, filed on Mar. 31, 2021 in the State Intellectual Property Office of China, the contents of all of which are hereby incorporated by reference.

BACKGROUND

1. Technical Field

The present disclosure relates to robot control technology, and particularly to a motion control method, a robot controller, and a computer readable storage medium.

2. Description of Related Art

With the continuous development of technologies, robot technology has received extensive attention from all walks of life because of its great worth in research and application. Humanoid robot control is an important topic for the researches in robot control technology. However, in the actual control process of a humanoid robot, if only the control for the movement of the robotic arms of the humanoid robot is considered, the robotic arms cannot be guaranteed to have enough joint operation space, while the leas of the humanoid robot prone to be unable to maintain balance when the arms move in a large range, which leads to poor overall operation performance of the humanoid robot.

BRIEF DESCRIPTION OF THE WINOS

To describe the technical schemes in the embodiments of the present disclosure or in the prior art more clearly, the following briefly introduces the drawings required for describing the embodiments or the prior art. It should be understood that, the drawings in the following description merely show some embodiments. For those skilled in the art, other drawings can be obtained according to the drawings without creative efforts.

DETAILED DESCRIPTION

Figure 1:
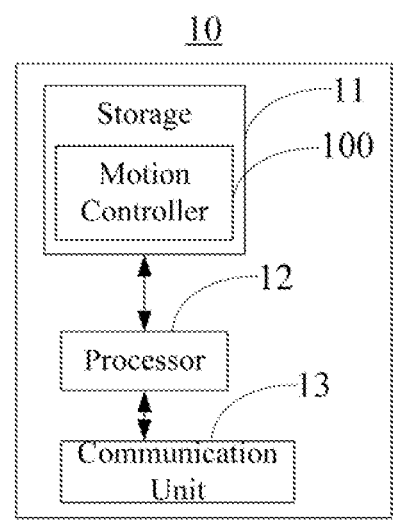
FIG. 1 is a schematic block diagram of the composition of a robot controller according to an embodiment of the present disclosure.

In order to make the objects, technical solutions and advantages of the embodiments of the present disclosure more clear, the technical solutions in the embodiments of the present disclosure will be clearly and completely described below with reference to the drawings in the embodiments of the present disclosure. Apparently, the described embodiments are part of the embodiments of the present disclosure, not all of the embodiments. The components of the embodiments of the present disclosure that are described and illustrated in the drawings herein may generally be arranged and designed in a variety of different configurations.

Therefore, the following detailed description of the embodiments of the present disclosure provided in the drawings is not intended to limit the scope of the present disclosure, but merely represent the selected embodiments of the present disclosure. Based on the embodiments in the present disclosure, all other embodiments obtained by those of ordinary skill in the art without creative work fall within the protection scope of the present disclosure.

It should be noted that, in the following figures, similar numerals and letters refer to similar items. Therefore, once an item is defined in one figure, it does not require further definition and explanation in subsequent figures.

In the description of the present disclosure, it is to be understood that the orientational or positional relationship indicated by the terms "center", "upper", "lower", "left", "right", "vertical", "horizontal", "inner", "outer", or the like is based on the orientational or positional relationship shown in the drawings, that in the usual placement of the product related to the present disclosure, or that commonly understood by those skilled in the art, and is merely for the convenience of describing the present disclosure and simplifying the description, rather than indicating or implying that the device or component referred to must have a particular orientation, be constructed and operated in a particular orientation, hence should not be understood as limitations to the present disclosure.

Simultaneously, relational terms such as "first" and "second" are used only to distinguish one entity or operation from another entity or operation, and do not necessarily require or imply the existence of any actual relationship or sequence between these entities or operations. Moreover, the terms "comprising", "including" or any other variation thereof are intended to encompass non-exclusive inclusion such that a process, method, article or apparatus (device) comprising a series of elements includes not only those elements, but also includes other elements not explicitly listed or inherent to the process, method, article or apparatus. Without further limitation, an element limited by the sentence "comprising a . . . " does not preclude the existence of additional identical elements in a process, method, article or apparatus that includes the element. For those of ordinary skill in the art, the specific meanings of the above-mentioned terms in the present disclosure can be understood according to the specific condition.

Some embodiments of the present disclosure will be described in detail below with reference to the drawings. The following embodiments and the features therein may be combined with each other while there is no confliction therebetween.

FIG. 1 is a schematic block diagram of the composition of a robot controller according to an embodiment of the present disclosure. As shown in FIG. 1, a robot controller 10 is provided. In this embodiment, the robot controller 10 is used to regulate the motion status of the humanoid robot. The robot controller 10 may be connected with the humanoid robot by remote communication or be integrated with the humanoid robot, so that when controlling the humanoid robot to move, the limit of the joint motion of the humanoid robot can be avoided, and the operating space of the arms can be expanded while maintaining the balance of the legs of the robot, thereby improving the overall operation performance of the humanoid robot.

In this embodiment, the robot controller 10 may include a storage 11, a processor 12, a communication unit 13, and a motion controller 100. The components of the storage 11, the processor 12 and the communication unit 13 are directly or indirectly electrically connected to each other to realize data transmission or interaction. For example, the components of the storage 11, the processor 12 and the communication unit 13 may be electrically connected to each other through one or more communication buses or signal lines.

In this embodiment, the storage 11 may be, but not limited to, a random access memory (RAM), a read only memory (ROM), a programmable read only memory (PROM), erasable programmable read-Only memory (EPROM), electrical erasable programmable read-only memory (EEPROM), or the like. In which, the storage 11 is used for storing computer programs, and the processor 12 can execute the computer programs correspondingly after receiving execution instructions.

In which, the storage 11 is also used for storing preset position restriction conditions for the humanoid robot. The preset position restriction conditions are used to represent the motion range limits of each joint of the humanoid robot during motions. The motion range limits include a preset upper limit and a preset lower limit of the corresponding joint in terms of specific motion scales (e.g., joint rotation angle and joint distribution position). The robot controller 10 may use the preset position restriction conditions to limit the joint notion range of the humanoid robot.

In this embodiment, the processor 12 may be an integrated circuit chip with signal processing capability. The processor 12 may be a general purpose processor including at least one of a central processing unit (CPU), a graphics processing unit (GPU), a network processor (NP), a digital signal processor (DSP), an application specific integrated circuit (ASIC), a field-programmable gate array (FPGA) or other programmable logic devices, discrete gate, transistor car logic device, and discrete hardware component. The general purpose processor may be a microprocessor or the processor may also be any conventional processor that may implement or execute the methods, steps, and the logical block diagrams disclosed in the embodiments of the present disclosure.

In this embodiment, the communication unit 13 is used for establishing a communication connection between the robot controller 10 and other electronic devices through a network, and for sending/receiving data through the network, where the network includes a wired communication and a wireless communication network. For example, the robot controller 10 may obtain a desired motion trajectory corresponding to a task to be performed for the humanoid robot from a task planning device through the communication unit 13, and send a motion control instruction to the humanoid robot through the communication unit 13 so that the humanoid robot moves according to the motion control instruction so as to complete the task to be performed correspondingly.

In this embodiment, the motion controller 100 may include at least one software function module that can be stored in the storage 11 or in the operating system of the robot controller 10 in the form of software or firmware. The processor 12 may be used to execute executable modules such as software function modules and computer programs included in the motion controller that str stored in the storage 11. The robot controller 10 may optimize the motion of the humanoid robot as a whole through the motion controller 100 to avoid the limits of joint motion, and expand the operation space of the arms of the robot while maintaining the balance of the legs of the robot, thereby improving the operational performance of the humanoid robot.

It can be understood that the composition of the robot controller 10 in FIG. 1 is only an example of that of a robot controller, and the robot controller 10 may further include more or less elements than those shown in FIG. 1, or have a different configuration from that shown in FIG. 1. Each of the elements shown in FIG. 1 may be implemented in hardware, software, or a combination thereof.

In the present disclosure, in order to ensure that the motion controller 100 can optimize the motion of the humanoid robot as a whole to avoid the limits of joint motion, and expand the operation space of the arms of the robot while maintaining the balance of the legs of the robot so as to improve the operational performance of the humanoid robots, a motion control method for a humanoid robot is provided. The motion control method provided by the present disclosure will be described in detail below.

Figure 2:
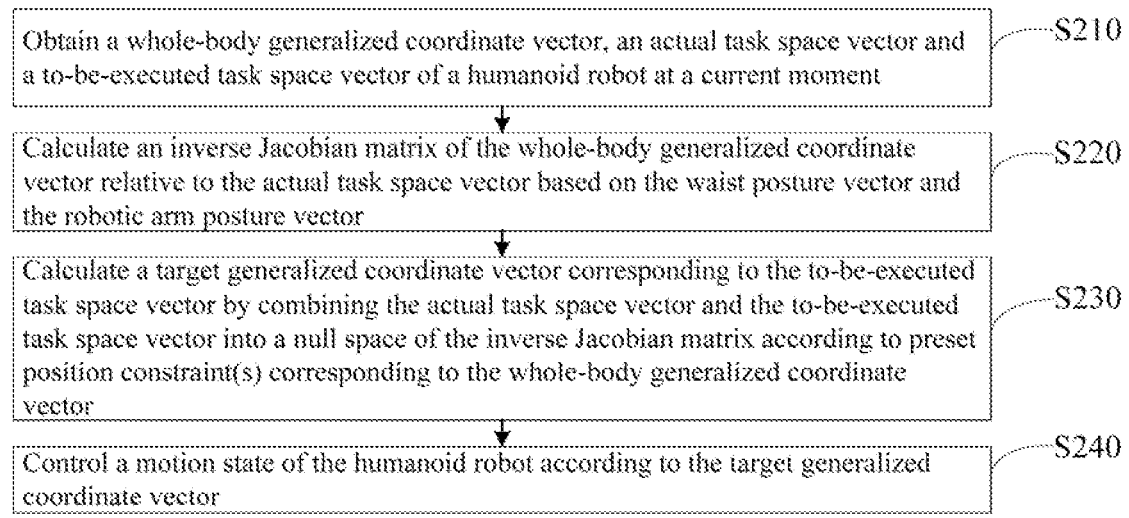
FIG. 2 is a flow chart of a robot control method according to an embodiment of the present disclosure.

FIG. 2 is a flow chart of a robot control method according to an embodiment of the present disclosure. In this embodiment, the motion control method is a computer-implemented method executable for a processor of a humanoid robot. The method may be implemented through the robot controller shown in FIG. 1 or a motion controller shown in FIG. 5. As shown in FIG. 1, the method may include the following steps.

S210: obtaining a whole-body generalized coordinate vector, an actual task space vector and a to-be-executed task space vector of the humanoid robot at a current moment.

In this embodiment, the humanoid robot includes two robotic arms, two robotic feet, two robotic legs, and a waist. The two robotic legs of the humanoid robot connected to the waist may be regarded as a floating base, and a fixed coordinate system may be built at the robotic foot of the human robot which is the supporting foot (i.e., the foot contacting the ground when the human robot stands). Then, on the basis of the fixed coordinate system, a waist posture expression of the waist of the humanoid robot in the fixed coordinate system can be determined, that is, the waist posture vector $\eta=[x\ y\ z\ r_x\ r_y\ r_z]$, where x, y and z are respectively the coordinates of the waist of the humanoid robot in the fixed coordinate system. $r_x$, $r_y$, and $r_z$ are deflection angles of the waist of the humanoid robot relative to the three-dimensional coordinate axes (i.e., X-axis, Y-axis and Z-axis) in the fixed coordinate system. At the same time, the posture expression of the robotic arm of the humanoid robot may also be determined in the fixed coordinate system, that is, the robotic arm posture vector $q=[q_1, q_2, q_3, q_4, \ldots, q_i]$, where $q_i$ represents the joint angle of the i-th joint of the robotic arm of the humanoid robot in the fixed coordinate system. In one embodiment, the robotic arm may be a robotic arm with six degree-of-freedom (DOF), that is, the robotic arm may include six joints (i=6); or the robotic arm may also be a robotic arm of seven degree-of-freedom, that is, the robotic arm may include seven joints (i=7).

Therefore, when a waist posture vector and a robotic arm posture vector of the humanoid robot relative to the fixed reference frame at the current moment are obtained, the waist posture vector and the robotic arm posture vector may be directly combined to form the corresponding whole-body generalized coordinate vector $\zeta=[\eta q]^T$, and the motion state of the waist of the robot relative to the feet and the motion posture of the robotic arm relative tis the feet are coordinated by taking the feet of the humanoid robot as a reference through whole-body generalized coordinate vector, thereby effectively describing the overall motion status of the humanoid robot at the current moment.

In addition, the actual task space vector is used to represent the pose state relative to the task space that is actually represented by the end of the robotic arm of the humanoid robot in the above-mentioned fixed coordinate system at the current moment. The to-be-executed task space vector is used to indicate that when the to-be-executed task at the current moment is completed by the end f the robotic arm of the humanoid robot, the pose state relative to the task space which is expected to be represented by the end of the robotic arm of the humanoid robot in the above-mentioned fixed coordinate system.

S220: calculating, an inverse Jacobian matrix of the whole-body generalized coordinate vector relative to the actual task space vector based on the waist posture vector and the robotic arm posture vector.

In this embodiment, after the robot controller 10 obtains the whole-body generalized coordinate vector of the humanoid robot corresponding to the current moment, it may analyze the whole-body generalized coordinate vector, and calculate the forward Jacobian matrix between the whole-body generalized coordinate vector and the actual task space vector of the humanoid robot at the current moment based on the relationship σζ=f( ) (where σ represents the task space vector, ζ represents the generalized coordinate vector) between the generalized coordinate vector revealed by the generalized forward kinematics and the task space vector, and then solving the inverse Jacobian matrix meeting the generalized inverse kinematics by performing, the singular value decomposition (SVD) using the generalized inverse kinematics based on the calculated forward Jacobian matrix, so that the generalized coordinate vector that achieves the to-be-executed task space vector can be determined through the inverse Jacobian matrix subsequently.

Figure 3:
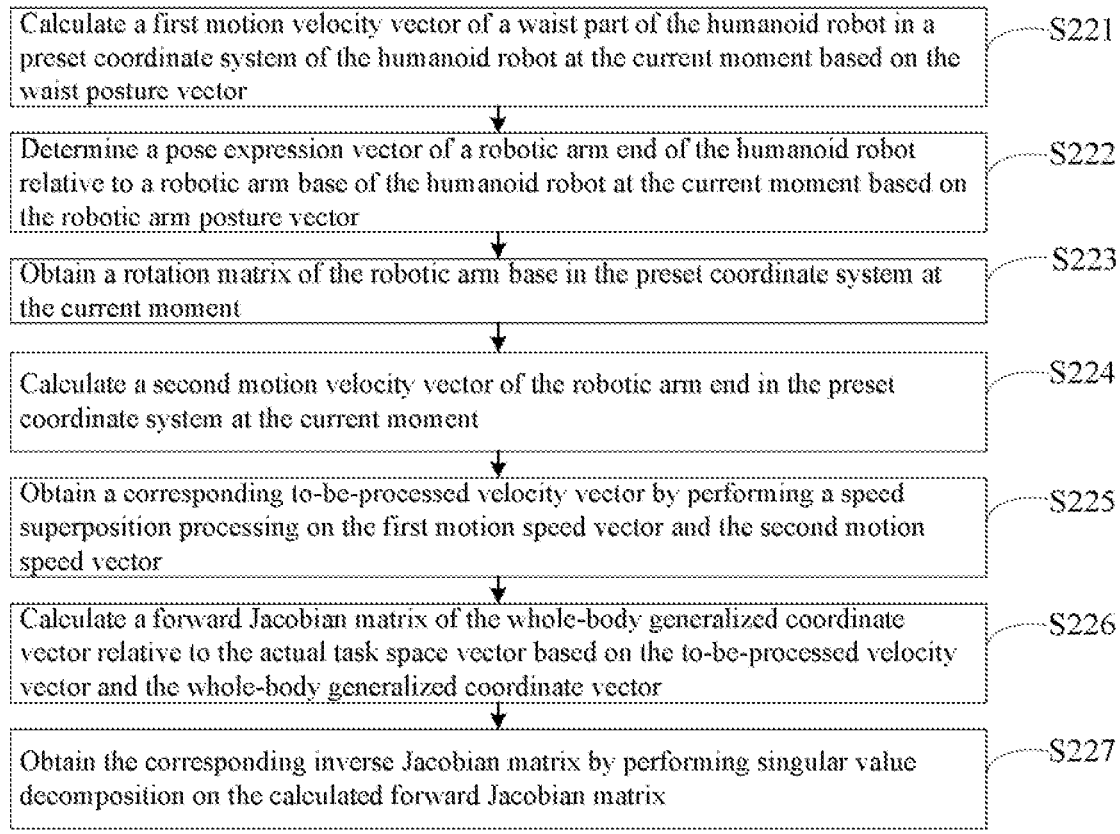
FIG. 3 is as flow chart of sub-steps included in step S220 of FIG. 1.

FIG. 3 is a flow chart of sub-steps included in step S220 of FIG. 2. As shown in FIG. 3, in one embodiment, step S220 may include sub-steps S221-S227 to ensure that the robot controller 10 may normally calculate the inverse Jacobian matrix between the generalized coordinate vector and the task space vector of the humanoid robot at the current moment.

S221: calculating a first motion velocity vector of a waist part of the humanoid robot in a preset coordinate system of the humanoid robot at the current moment based on the waist posture vector.

In this embodiment, the first motion velocity vector includes a linear velocity and an angular velocity of the waist in the preset coordinate system. The preset coordinate system has a center point between two feet of the humanoid robot touching a plane as an origin, where the center point is the center of a plane of the ground on which the two feet of the humanoid robot contact. The first motion velocity vector may be calculated by the robot controller 10 through performing derivation on the basis of the pose of the waist relative to the feet that is determined according to the waist posture vector. At this time, the pose of the waist of the humanoid robot relative to the feet may be expressed as an equation of:

$$\substack{\text{foot} \\ \text{torso}} T = \begin{bmatrix} Rot_x(r_x) * Rot_x(r_x) * Rot_x(r_x) & [x\ y\ z]^T \\ 0 & 1 \end{bmatrix};$$

where, $\substack{\text{foot} \\ \text{torso}}^{foot}T$ represents the pose of the waist of the humanoid robot relative to the foot, $Rot_x(r_x)$ represents the Euler angle of the component $r_x$ in the waist posture vector, $Rot_y(r_y)$ represents the Euler angle of the component $r_y$ in the waist posture vector, $Rot_z(r_z)$ represents the Euler angles to the component $r_z$ of the waist posture vector.

Thus, the first motion velocity vector may be calculated using an equation of:

$$\begin{bmatrix} \substack{\text{foot} \\ \text{torso}} v \\ \substack{\text{foot} \\ \text{torso}} w \end{bmatrix} = \begin{bmatrix} \frac{\partial f}{\partial x} & \frac{\partial f}{\partial y} & \frac{\partial f}{\partial z} & \frac{\partial f}{\partial r_x} & \frac{\partial f}{\partial r_y} & \frac{\partial f}{\partial r_z} \\ 0 & 0 & 0 & 1 & 0 & 0 \\ 0 & 0 & 0 & 0 & 1 & 0 \\ 0 & 0 & 0 & 0 & 0 & 1 \end{bmatrix} \dot{\eta}^T;$$

where, $\substack{\text{foot} \\ \text{torso}}^{foot}v$ represents the linear velocity of the waist relative to the feet, and $\substack{\text{foot} \\ \text{torso}}^{foot}w$ represents the angular velocity of the waist relative to the feet.

S222: determining a pose expression vector of a robotic area end of the humanoid robot relative to a robotic arm base of the humanoid robot at the current moment based on the robotic arm posture vector.

In this embodiment, since the robotic arms included in the humanoid robot are connected to the torso of the humanoid robot where the waist is located through the robotic arm base, the pose expression vector of the end of the robotic arm with respect the robotic arm base may be solved by analyzing the robotic arm posture vector.

S723: obtaining a rotation matrix of the robotic arm base in the preset coordinate system at the current moment.

S224: calculating a second motion velocity vector of the robotic arm end in the preset coordinate system at the current moment.

In this embodiment, the second motion velocity vector includes a linear velocity and an angular velocity of the robotic arm end in the preset coordinate system. The second movement velocity matrix may be obtained by the robot controller 10 through performing derivation on the pose expression vector to perform matrix aggregation with the rotation matrix. At this time, the second motion velocity vector may be calculated using an equation of:

$$\begin{bmatrix} \substack{\text{foot} \\ \text{tool}} v \\ \substack{\text{foot} \\ \text{tool}} w \end{bmatrix} = \begin{bmatrix} \substack{\text{foot} \\ \text{base}} R & 0 \\ 0 & \substack{\text{foot} \\ \text{base}} R \end{bmatrix} \substack{\text{base} \\ \text{tool}} J(q)\dot{q};$$

where $\substack{\text{foot} \\ \text{tool}}^{foot}v$ represent the linear velocity of the end of the robotic arm relative to the $\substack{\text{foot} \\ \text{tool}}^{foot}w$ represents the angular velocity of the end of the robotic arm relative to the feet, $\substack{\text{foot} \\ \text{base}}^{foot}R$ represents the rotation matrix of the robotic arm base relative to the feet, and $\substack{\text{base} \\ \text{tool}}^{base}J(q)q$ is obtained by performing derivation on the pose expression vector of the end of the robotic arm relative to the robotic arm base.

S225: obtaining a corresponding to-be-processed velocity vector by performing a speed superposition processing on the first motion speed vector and the second motion speed vector.

In this embodiment, the to-be-processed velocity vector may be obtained by adding the elements of the same speed type in the first motion speed matrix and the second motion speed matrix. At this time, the superposition relationship between the to-be-processed velocity and the first motion speed vector as well as the second motion speed vector may be expressed using an equation of:

$$A = \begin{bmatrix} {}^{foot}_{torso}v + {}^{foot}_{tool}v \\ {}^{foot}_{torso}w + {}^{foot}_{tool}w \end{bmatrix};$$

where, A represents the to-be-processed velocity vector.

S226: calculating a forward Jacobian matrix of the whole-body generalized coordinate vector relative to the actual task space vector based on the to-be-processed velocity vector and the whole-body generalized coordinate vector.

In this embodiment, after the to-be-processed velocity vector is solved, the relationship σζ=f( ) between the generalized coordinate vector revealed by the above-mentioned generalized forward kinematics and the task space vector may be derived and deformed, and the to-be-processed velocity vector may be substituted into the deformed equation to determine the relationship of the to-be-proceed velocity vector, the whole-body generalized coordinate vector, and the forward Jacobian matrix, and then the forward Jacobian matrix of the whole-body generalized coordinate vector relative to the actual task space vector is calculated based on the relationship. At this time, the relationship of the to-be-proceed velocity vector, the whole-body generalized coordinate vector, and the forward Jacobian matrix may be expressed using an equation of:

$$A = J(\zeta)\dot{\zeta};$$

where, A represents the to-be-processed velocity vector, ζ represents the whole-body generalized coordinate vector, $\dot{\zeta}$ represents a first order derivative of the whole-body generalized coordinate vector with respect to time, J(ζ) represents the forward Jacobian matrix of the whole-body generalized coordinate vector relative to the actual task space vector.

S227: obtaining the corresponding inverse Jacobian matrix by performing singular value decomposition on the calculated forward Jacobian matrix.

In this embodiment, the robot controller 10 may obtain the inverse Jacobian matrix J$^\dagger$(ζ) corresponding to the forward Jacobian matrix J(ζ) by performing SVD on the calculated forward Jacobian matrix J(ζ).

Therefore, in the present disclosure, it can make the robot controller 10 normally calculate the inverse Jacobian matrix between the generalized coordinate vector of the humanoid robot and the task space vector at the current moment by executing the above-mentioned sub-steps S221-S227, thereby facilitating the subsequent determining the generalized coordinate vector that achieves the to-be-executed task space vector through the inverse Jacobian matrix.

S230: calculating a target generalized coordinate vector corresponding to the to-be-executed task space vector by combining the actual task space vector and the to-be-executed task space vector into a null space of the inverse Jacobian matrix according to preset position constraint corresponding to the whole-body generalized coordinate vector.

In this embodiment, the preset position restriction condition may be composed of multiple sub-conditions, and each sub-condition corresponds to a vector element in the whole-body generalized coordinate vector, that is, the preset upper limit and the preset lower limit included in each sub-condition are used to limit the limit motion range of the corresponding vector component in the whole-body generalized coordinate vector, so that when the humanoid robot moves within the limit motion range corresponding to all the sub-conditions, it can guarantee that the motion controller 100 moves while avoiding the limits of joint motion, and expand the operation space of the arms of the robot while maintaining the balance of the legs of the robot, and the operating space of the arms can be expanded while maintaining the balance of the legs of the robot, thereby improving the operation performance of the humanoid robot.

To this end, in the present disclosure, the generalized coordinate vector matching the to-be-executed task space vector is solved by combining the actual task space vector and the to-be-executed task space vector into the null space of the inverse Jacobian matrix, and the preset position constraints are used to limit the value of the generalized coordinate vector during solving the generalized coordinate vector, so as to ensure that when the eventually obtained target generalized coordinate vector is used, it can not only guarantee that the humanoid robot avoids the limit motion of joint motion, but also guarantee that the to-be-executed task can be effectively completed while maintaining the balance of the leas of the robot, thereby improving the operation performance of the humanoid robot.

Figure 4:
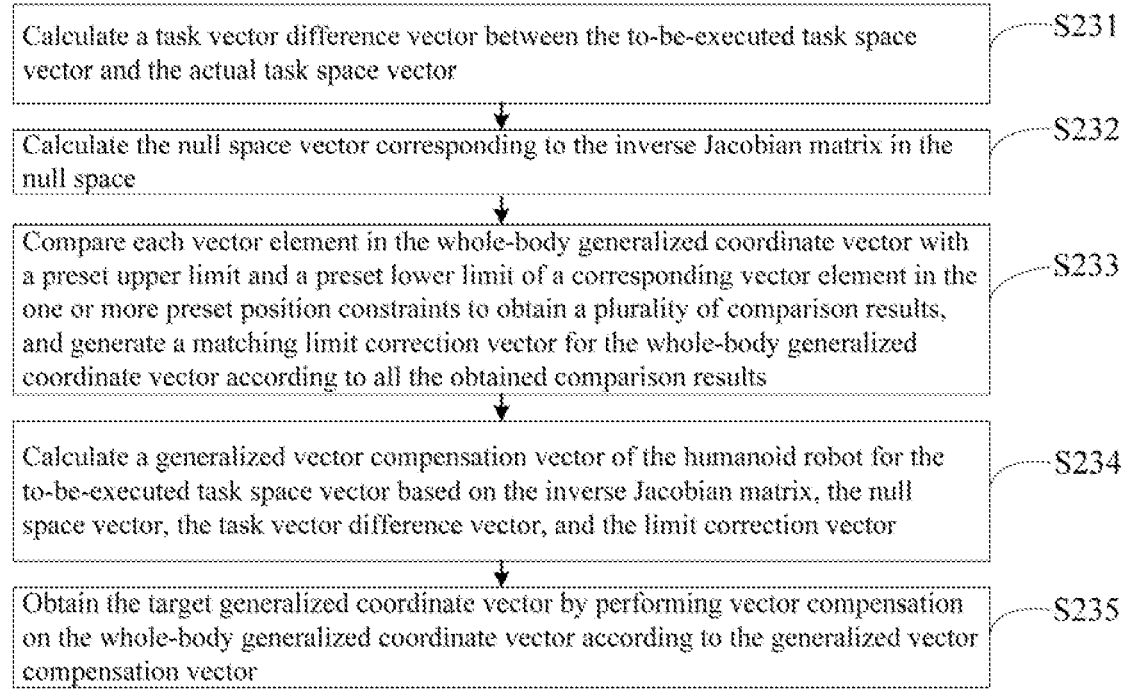
FIG. 4 is a flow chart of sub-steps included in step S230 of FIG. 2.

FIG. 4 is a flow chart of sub-steps included in step S230 of FIG. 2. As shown in FIG. 4, in this embodiment, step S230 may include sub-steps S231-S235 for ensuring that the robot controller 10 can calculate the target generalized coordinate vector that can not only guarantee that the humanoid robot moves while avoiding the limits of joint motion, but also guarantee that the humanoid robot can effectively complete the to-be-executed task while balance of the legs of the robot is maintained.

S231: calculating a task vector difference vector between the to-be-executed task space vector and the actual task space vector.

S232: calculating the null space vector corresponding to the inverse Jacobian matrix in the null space.

In this embodiment, the relationship between the null space matrix and the inverse Jacobian matrix may be expressed using an equation of:

$$Z(\zeta)=(I-J^\dagger(\zeta)J(\zeta));$$

where, Z(ζ) represents the null space vector, J$^\dagger$(ζ) represents the inverse Jacobian matrix, and J(ζ) represents the forward Jacobian matrix.

S231: comparing each vector element in the whole-body generalized coordinate vector with a preset upper limit and a preset lower limit of a corresponding vector element in the one or more preset position constraints to obtain a plurality of comparison results, and generating a matching limit correction vector for the whole-body generalized coordinate vector according to all the obtained comparison results.

In this embodiment, the robot controller 10 stores a plurality of correction construction strategies for constructing the limit correction matrix, and each correction construction strategy is respectively associated with one vector elements in the whole-body generalized coordinate vectors. After the robot controller 10 compares a certain vector element in the whole-body generalized coordinate vector with the preset upper limit and the preset lower limit of the corresponding vector element in the preset position restriction condition, it will call the correction construction strategy corresponding to the vector element to generate a matrix element in the limit correction matrix for the vector element according to the comparison result, so as to limit the value range of the generalized coordinate vector when calculating the target generalized coordinate vector through all the constructed matrix elements, thereby avoiding excessive movement of joints.

In one embodiment, the correction construction strategy of the robot controller 10 may be expressed using an equation of:

$$\Delta S_i = \begin{cases} 0 & \text{if } \zeta_{imin} < \zeta_i < \zeta_{imax} \\ (k(\zeta_i - \zeta_{imin}))^2 & \text{if } \zeta_i \leq \zeta_{imin} \\ (-k(\zeta_i - \zeta_{imax}))^2 & \text{if } \zeta_i \geq \zeta_{imax} \end{cases} ;$$

where, $\Delta S_i$ represents the i-th matrix element of the limit correction matrix $\Delta S$, $\zeta_i$ represents the i-th vector in the whole-body generalized coordinate vector, $\zeta_{imin}$ represents the preset lower limit corresponding to the i-th vector demerit in the preset position restriction condition, $\zeta_{imax}$ represents the preset upper limit corresponding to the i-th vector element in the preset position restriction condition, and k represents the correction degree of the robot controller 10 for the joint motion limit.

S234: calculating a generalized vector compensation vector of the humanoid robot for the to-be-executed task space vector based on the inverse Jacobian matrix, the null space vector, the task vector difference vector, and the limit correction vector.

In this embodiment, after the robot controller 10 obtains the inverse Jacobian matrix, the null space vector, the task vector difference matrix, and the limit correction vector, the task vector difference matrix and the limit correction matrix may be combined in the null space of the inverse Jacobian matrix according to the generalized inverse kinematics so as to obtain a generalized vector compensation matrix for performing parameter compensation on the current whole-body generalized coordinate vector when the humanoid robot is to implement the to-be-executed task corresponding to the to-be-executed task space vector, thereby guaranteeing that the target generalized coordinate vector obtained by processing the whole-body generalized coordinate vector through the generalized vector compensation matrix can guarantee that the motion state of the humanoid robot when operating correspondingly can be maintained in a state avoiding the limits of joint motion, and the to-be-executed task can be effectively completed while balance of the legs of the robot is maintained, thereby optimizing the motion of the humanoid robot in an overall manner by using the preset joint motion limit conditions from the perspective of zero space, and improving the operation performance of the humanoid robot.

At this time, a relation of the generalized vector compensation vector, the inverse Jacobian matrix, the null space vector, the task vector difference vector and the limit correction vector may be expressed using an equation of:

$$\Delta\zeta = J^\dagger(\zeta)\Delta\sigma + Z(\zeta)\Delta S;$$

where, $\Delta\zeta$ represents the generalized vector compensation vector, $J^\dagger(\zeta)$ represents the inverse Jacobian matrix, $Z(\zeta)$ represents the null space vector, $\Delta\sigma$ represents the task vector difference vector, and $\Delta S$ represents the limit correction vector.

S235: obtaining the target generalized coordinate vector by performing vector compensation on the whole-body generalized coordinate vector according to the generalized vector compensation vector.

In this embodiment, by performing matrix addition on the element content at the same element position of the generalized vector compensation matrix and the whole-body generalized coordinate vector, it can obtain the target generalized coordinate vector that can not only guarantee that the humanoid robot moves while avoiding the limits of joint motion, but also guarantee that the humanoid robot can effectively complete the to-be-executed task while the balance of the legs of the robot is maintained.

Therefore, the present disclosure can make the robot controller 10 to calculate the target generalized coordinate vector that can not only guarantee that the humanoid robot moves while avoiding the limits of joint motion, but also guarantee that the humanoid robot can effectively complete the to-be-executed task while the balance of the legs of the robot is maintained, by performing the above-mentioned sub-steps S231-S235.

S240: controlling a motion state of the humanoid robot according to the target generalized coordinate vector.

In this embodiment, after the robot controller 10 calculates the target generalized coordinate vector corresponding to the to-be-executed task space vector, the motion parameters of each component (including each joint motors of the robotic arm of the humanoid robot and each joint motors of the waist of the humanoid robot) of the robot that corresponds to the whole-body generalized coordinate vector of the humanoid robot at the current moment may be adjusted according to the target generalized coordinate vector, so that the humanoid robot moves with reference to the target generalized coordinate vector so as to guarantee that the humanoid robot can effectively complete the to-be-executed task while maintaining the balance of the legs of the robot, and guarantee that the humanoid robot moves while avoiding the limits of joint motion, thereby improving the operation performance of the humanoid robot.

Therefore, the present disclosure can optimize the motion of the humanoid robot in an overall manner to avoid the limits of joint motion and expand the operation space of the arms of the robot while maintaining the balance of the legs of the robot, thereby improving the operational performance of the humanoid robot, by performing the above-mentioned sub-steps S210-S240.

In the present disclosure, in order to ensure that the robot controller 10 can execute the above-mentioned motion control method through the motion controller 100, the present disclosure implements the forgoing functions by performing functional module division on the motion controller 100. The specific components of the motion controller 100 provided by the present disclosure are described below accordingly.

Figure 5:
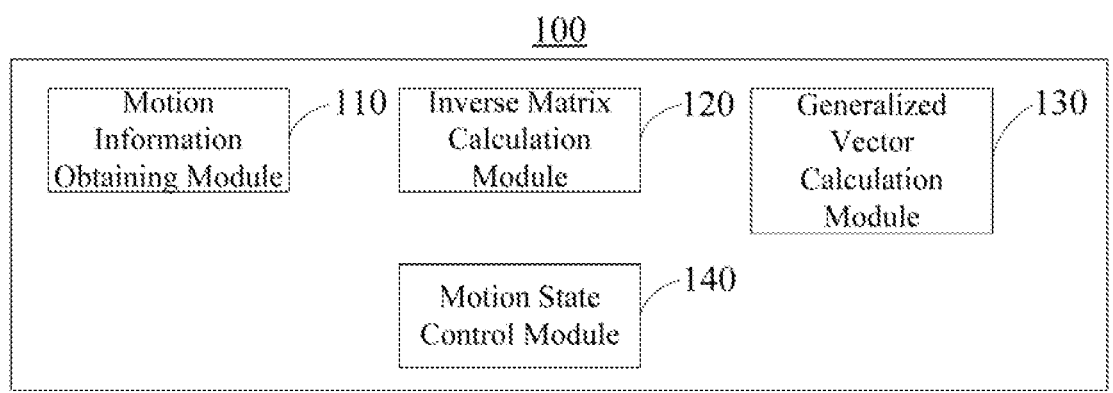
FIG. 5 is a schematic block diagram of the composition of a motion controller according to an embodiment of the present disclosure.

FIG. 5 is a schematic block diagram of the composition of a motion controller 100 according to an embodiment of the present disclosure. As shown in FIG. 5, in this embodiment, the motion controller 100 may include a motion information obtaining module 110, an inverse matrix calculation module 120, a generalized vector calculation module 130, and a motion state control module 140.

The motion information obtaining module 110 is configured to obtain a whole-body generalized coordinate vector, an actual task space vector and a to-be-executed task space vector of the humanoid robot at a current moment, where the whole-body generalized coordinate vector is composed of a waist posture vector and a robotic arm posture vector of the humanoid robot.

The inverse matrix calculation module 120 is configured to calculate an inverse Jacobin matrix of the whole-body generalized coordinate vector relative to the actual task space vector based on the waist posture vector and the robotic arm posture vector.

The generalized vector calculation module 130 is configured to calculate a target generalized coordinate vector corresponding to the to-be-executed task space vector by combining the actual task space vector and the to-beexecuted task space vector into a null space of the inverse Jacobin matrix according to one or more preset position constraints corresponding to the whole-body generalized coordinate vector.

The motion state control module 140 is configured to control a motion state of the humanoid robot according to the target generalized coordinate vector.

Figure 6:
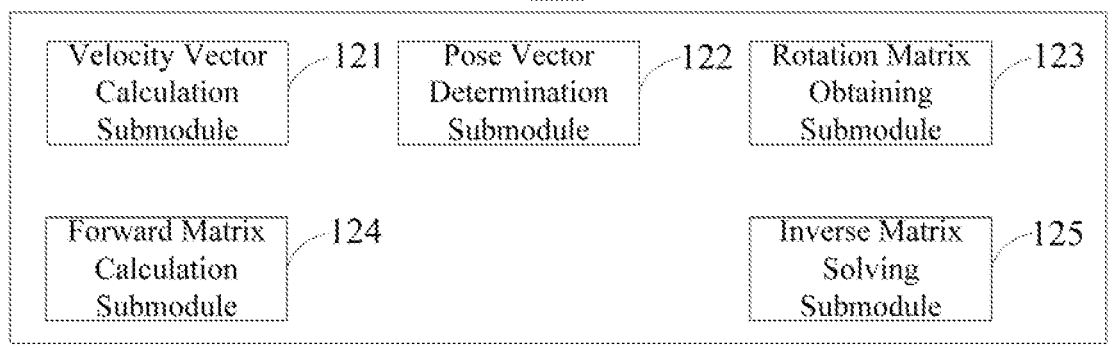
FIG. 6 is a schematic block diagram of the composition of an inverse matrix calculation module of FIG. 5.

FIG. 6 is a schematic block diagram of the composition of an inverse matrix calculation module of FIG. 5. As shown in FIG. 6, in this embodiment, the inverse matrix calculation module 120 may include a velocity vector calculation submodule 121, a pose vector determination submodule 122, a rotation matrix obtaining submodule 123, a forward matrix calculation submodule 124, and an inverse matrix solving submodule 125.

The velocity vector calculation submodule 121 is configured to calculate a first motion velocity vector of a waist part of the humanoid robot in a preset coordinate system of the humanoid robot at the current moment based on the waist posture vector, where the first motion velocity vector includes a linear velocity and an angular velocity of the waist in the preset coordinate system, where the preset coordinate system has a center point between two feet of the humanoid robot touching a plane as an origin.

The pose vector determination submodule 122 is configured to determine a pose expression vector of a robotic arm end of the humanoid robot relative to a robotic arm base of the humanoid robot at the current moment based on the robotic arm posture vector.

The rotation matrix obtaining submodule 123 is configured to obtain a rotation matrix of the robotic arm base in the preset coordinate system at the current moment.

The velocity vector calculation submodule 121 is further configured to calculate a second motion velocity vector of the robotic arm end in the preset coordinate system at the current moment, where the second motion velocity vector includes a linear velocity and an angular velocity of the robotic arm end in the preset coordinate system.

The velocity vector calculation submodule 121 is further configured to obtain a corresponding to-be-processed velocity vector by performing a speed superposition processing on the first motion speed vector and the second motion speed vector.

The forward matrix calculation submodule 124 is configured to calculate a forward Jacobian matrix of the whole-body generalized coordinate vector relative to the actual task space vector based on the to-be-processed velocity vector and the whole-body generalized coordinate vector.

The inverse matrix solving submodule 125 is configured to obtain the corresponding inverse Jacobian matrix by performing singular value decomposition the calculated forward Jacobian matrix.

In this process, a relation of the to-be-processed velocity vector, the whole-body generalized coordinate vector, and the forward Jacobian matrix is expressed using an equation of:

$$A = J(\zeta)\dot{\zeta};$$

where, A represents the to-be-processed velocity vector, $\zeta$ represents the whole-body generalized coordinate vector, $\dot{\zeta}$ represents a first order derivative of the whole-body generalized coordinate vector with respect do time, $J(\zeta)$ represents the forward Jacobian matrix.

Figure 7:
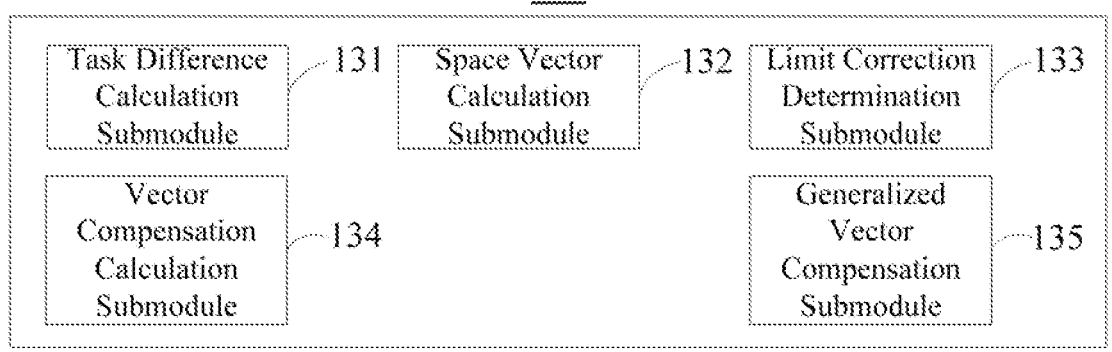
FIG. 7 is a schematic block diagram of the composition of a generalized vector calculation module of FIG. 5.

FIG. 7 is a schematic block diagram of the composition of the generalized vector calculation module 130 of FIG. 5. As shown in FIG. 7, in this embodiment, the generalized vector calculation module 130 may include a task difference calculation submodule 131, a space vector calculation submodule 132, a limit correction determination submodule 133, a vector compensation calculation submodule 134 and a generalized vector compensation submodule 135.

The task difference calculation submodule 131 is configured to calculate a task vector difference vector between the to-be-executed task space vector and the actual task space vector.

The space vector calculation submodule 132 is configured to calculate the null space vector corresponding to the inverse Jacobian matrix in the null space.

The limit correction determination submodule 133 is configured to compare each vector element in the whole-body generalized coordinate vector with a preset upper limit and a preset lower limit of a corresponding vector element in the one or more preset position constraints to obtain a plurality of comparison results, and generating a matching limit correction vector for the whole-body generalized coordinate vector according to all the obtained comparison results.

The vector compensation calculation submodule 134 is configured to calculate a generalized vector compensation vector of the humanoid robot for the to-be-executed task space vector based on the inverse Jacobian matrix, the null space vector, the task vector difference vector, and the limit correction vector.

The generalized vector compensation submodule 135 is configured to obtain the target generalized coordinate vector by performing vector compensation on the whole-body generalized coordinate vector according to the generalized vector compensation vector.

In this process, a relation of the generalized vector compensation vector, the inverse Jacobian matrix, the null space vector, the task vector difference vector and the limit correction vector is expressed using an equation of:

$$\Delta\zeta = J^{\dagger}(\zeta)\Delta\sigma + Z(\zeta)\Delta S;$$

where, $\Delta\zeta$ represents the generalized vector compensation vector, $J^{\dagger}(\zeta)$ represents the inverse Jacobian matrix, $Z(\zeta)$ represents the null space vector, $\Delta\sigma$, represents the task vector difference vector, and $\Delta S$ represents the limit correction vector.

It should be noted that, the motion controller 100 provided by this embodiment has the same basic principles and technical effects as the above-mentioned motion control method. For a brief description, for parts not mentioned in this embodiment, reference may be made to the forgoing description of the motion control method.

In the embodiments provided in the present disclosure, it should be understood that the disclosed apparatus (device) and method may also be implemented in other manners. The device embodiments described above are merely illustrative, for example, the flowcharts and block diagrams in the drawings illustrate the architecture, functionality and operation that are possible to be implemented according to the apparatus, methods and computer program products of the embodiments of the present disclosure. In this regard, each block in the flowchart or block diagram may represent a module, program segment, or a part of codes that contains one or more executable instructions for implementing the specified logical function(s). It should also be noted that, in some alternative implementations, the functions denoted in the block may occur out of the order noted in the figures. For example, two blocks in succession may, in fact, be executed substantially concurrently, or the blocks may sometimes be executed in the reverse order, depending upon the functionality involved. It should also be noted that each block in the block diagrams and/or flowchart and combinations of the blocks in the block diagrams and/or flowchart may be implemented in a dedicated hardware-based system that perform the specified functions or actions, or be implemented in a combination of dedicated hardware and computer instructions.

In addition, each functional module in each embodiment of the present disclosure may be integrated together to form an independent part, or each module may exist independently, or too or more modules may be integrated to form an independent part. If the function(s) are implemented in the form of software functional modules and sold or used as independent products, they may be stored in a readable storage medium. Based on this understanding, the essential parts of the technical solution of the present disclosure or the parts that contribute to the prior art, or a part of the technical solution may be embodied in the form of software products. The computer software product is stored in a computer readable storage medium including a certain number of instructions to cause a computer device (e.g., a personal computer, a server, and a network device) to execute all or part of the steps of the methods described in each embodiment of the present disclosure. The above-mentioned computer readable storage medium may include a USB disk, a mobile hard disk, a read-only memory (ROM), a random access memory (RAM), a magnetic disk, and an optical disk which is capable of storing program codes.

To sum up, in the motion control method, the robot controller, and the computer readable storage medium provided by the present disclosure, by obtaining a whole-body generalized coordinate vector, an actual task space vector and a to-be-executed task space vector of a humanoid robot at a current moment, calculating an inverse Jacobian matrix of a whole-body generalized coordinate vector relative to an actual task space vector of a humanoid robot based on the waist posture vector and the robotic arm posture vector, and calculating a target generalized coordinate vector corresponding to a to-be-executed task space vector at a current moment by combining an actual task space vector and the to-be-executed task space vector into a null space of the inverse Jacobian matrix according to preset position constraint(s) corresponding to the whole-body generalized coordinate vector, and controlling a motion state of the humanoid robot according to the target generalized coordinate vector, the motion of the humanoid robot is optimized as a whole by using the preset joint motion limit conditions from the perspective of zero space so as to achieve the purpose of controlling the humanoid robot to avoid the limits of the motion of joints, thereby expanding, the arm operation space on the basis of maintaining the balance of the legs of the robot and improving the operation performance of the humanoid robot.

The forgoing are only various embodiments of the present disclosure, and the protection scope of the present disclosure is not limited thereto. Any change or substitution that can be easily thought of by those skilled in the art within the technical scope disclosed in the present disclosure shall be covered within the protection scope of protection of the present disclosure. Therefore, the protection scope of the present disclosure shall be subject to the protection scope of the claims.

What is claimed is:

1. A computer-implemented motion control method for a humanoid robot, comprising:
    obtaining a whole-body generalized coordinate vector, an actual task space vector and a to-be-executed task space vector of the humanoid robot at a current moment, wherein the whole-body generalized coordinate vector is composed of a waist posture vector and a robotic arm posture vector of the humanoid robot;
    calculating an inverse Jacobian matrix of the whole-body generalized coordinate vector relative to the actual task space vector based on the waist posture vector and the robotic arm posture vector;
    calculating a target generalized coordinate vector corresponding to the to-be-executed task space vector by combining the actual task space vector and the to-be-executed task space vector into a null space of the inverse Jacobian matrix according to one or more preset position constraints corresponding to the whole-body generalized coordinate vector; and
    controlling a motion state of the humanoid robot according to the target generalized coordinate vector.

2. The method of claim 1, wherein the calculating the inverse Jacobian matrix of the whole-body generalized coordinate vector relative to the actual task space vector based on the waist posture vector and the robotic arm posture vector comprises:
    calculating a first motion velocity vector of a waist part of the humanoid robot in a preset coordinate system of the humanoid robot at the current moment based on the waist posture vector, wherein the first motion velocity vector includes a linear velocity and an angular velocity of the waist in the preset coordinate system, wherein the preset coordinate system has a center point between two feet of the humanoid robot touching a plane as an origin;
    determining a pose expression vector of a robotic arm end of the humanoid robot relative to a robotic arm base of the humanoid robot at the current moment based on the robotic arm posture vector;
    obtaining a rotation matrix of the robotic arm base in the preset coordinate system at the current moment;
    calculating a second motion velocity vector of the robotic arm end in the preset coordinate system at the current moment, wherein the second motion velocity vector includes a linear velocity and an angular velocity of the robotic arm end in the preset coordinate system;
    obtaining a corresponding to-be-processed velocity vector by performing a speed superposition processing on the first motion speed vector and the second motion speed vector;
    calculating a forward Jacobian matrix of the whole-body generalized coordinate vector relative to the actual task space vector based on the to-be-processed velocity vector and the whole-body generalized coordinate vector; and
    obtaining the corresponding inverse Jacobian matrix by performing singular value decomposition on the calculated forward Jacobian matrix.

3. The method of claim 2, Wherein a relation of the to-be-processed velocity vector, the whole-body generalized coordinate vector, and the forward Jacobian matrix is expressed using an equation of:

$$A = J(\zeta)\dot\zeta;$$

where, A represents the to-be-processed velocity vector, $\zeta$ represents the whole-body generalized coordinate vector, $\dot\zeta$ represents a first order derivative of the whole-body generalized coordinate vector with respect to time, $J(\zeta)$ represents the forward Jacobian matrix.

4. The method of claim 1, the calculating the target generalized coordinate vector corresponding to the to-be-executed task space vector by combining the actual task space vector and the to-be-executed task space vector into the null space of the inverse Jacobian matrix according to the one or more preset position constraints corresponding to the whole-body generalized coordinate vector comprises:
calculating a task vector difference vector between the to-be-executed task space vector and the actual task space vector;
calculating the null space vector corresponding to the inverse Jacobian matrix in the null space;
comparing each vector element in the whole-body generalized coordinate vector with a preset upper limit and a preset lower limit of a corresponding vector element in the one or more preset position constraints to obtain a plurality of comparison results, and generating a matching limit correction vector for the whole-body generalized coordinate vector according to all the obtained comparison results;
calculating a generalized vector compensation vector of the humanoid robot for the to-be-executed task space vector based on the inverse Jacobian matrix, the null space vector, the task vector difference vector, and the limit correction vector; and
obtaining the target generalized coordinate vector by performing vector compensation on the whole-body generalized coordinate vector according to the generalized vector compensation vector.

5. The method of claim 4, wherein a relation of the generalized vector compensation vector, the inverse Jacobian matrix, the null space vector, the task vector difference vector and the limit correction vector is expressed using an equation of:

$$\Delta \zeta = J^\dagger(\zeta) \Delta \sigma + Z(\zeta) \Delta S;$$

where represents the generalized vector compensation vector, $J^\dagger(\zeta)$ represents the inverse Jacobian matrix, $Z(\zeta)$ represents the null space vector, $\Delta \sigma$ represents the task vector difference vector, and $\Delta S$ represents the limit correction vector.

6. The method of claim 1, wherein the first motion velocity vector is calculated using an equation of:

$$\begin{bmatrix} {}^{foot}_{torso}v \\ {}^{foot}_{torso}w \end{bmatrix} = \begin{bmatrix} \frac{\partial f}{\partial x} & \frac{\partial f}{\partial y} & \frac{\partial f}{\partial z} & \frac{\partial f}{\partial r_x} & \frac{\partial f}{\partial r|_y} & \frac{\partial f}{\partial r_z} \\ 0 & 0 & 0 & 1 & 0 & 0 \\ 0 & 0 & 0 & 0 & 1 & 0 \\ 0 & 0 & 0 & 0 & 0 & 1 \end{bmatrix} \dot{\eta}^T;$$

where ${}^{foot}_{torso}v$ represents the linear velocity of the waist relative to the feet, and ${}^{foot}_{torso}w$ represents the angular velocity of the waist relative to the feet.

7. The method of claim 1, wherein the second motion velocity vector is calculated using an equation of:

$$\begin{bmatrix} {}^{foot}_{tool}v \\ {}^{foot}_{tool}w \end{bmatrix} = \begin{bmatrix} {}^{foot}_{base}R & 0 \\ 0 & {}^{foot}_{base}R \end{bmatrix} {}^{base}_{tool}J(q)\dot{q};$$

where, ${}^{foot}_{tool}v$ represent the linear velocity of the end of the robotic arm relative to the feet, ${}^{foot}_{tool}w$ represents the angular velocity of the end of the robotic arm relative to the feet, ${}^{foot}_{base}R$ represents the rotation matrix of the robotic arm base relative to the feet, and ${}^{base}_{tool}J(q)q$ is obtained by performing derivation on the pose expression vector of the end of the robotic arm relative to the robotic arm base.

8. A motion controller for a humanoid robot, comprising:
a processor;
a memory coupled to the processor; and
one or more computer programs stored in the memory and executable on the processor;
wherein, the one or more computer programs comprise:
instructions for obtaining a whole-body generalized coordinate vector, an actual task space vector and a to-be-executed task space vector of the humanoid robot at a current moment, wherein the whole-body generalized coordinate vector is composed of a waist posture vector and a robotic arm posture vector of the humanoid robot;
instructions for calculating an inverse Jacobian matrix of the whole-body generalized coordinate vector relative to the actual task space vector based on the waist posture vector and the robotic arm posture vector;
instructions for calculating a target generalized coordinate vector corresponding to the to-be-executed task space vector by combining the actual task space vector and the to-be-executed task space vector into a null space of the inverse Jacobian matrix according to one or more preset position constraints corresponding to the whole-body generalized coordinate vector; and
instructions for controlling a motion state of the humanoid robot according to the target generalized coordinate vector.

9. The motion controller of claim 8, wherein the instructions or calculating the inverse Jacobian matrix of the whole-body generalized coordinate vector relative to the actual task space vector comprise:
instructions for calculating a first motion velocity vector of a waist part of the humanoid robot in a preset coordinate system of the humanoid robot at the current moment based on the waist posture vector, wherein the first motion velocity vector includes a linear velocity and an angular velocity of the waist in the preset coordinate system, wherein the preset coordinate system has a center point between two feet of the humanoid robot touching a plane as an origin;
instructions for determining a pose expression vector of a robotic arm end of the humanoid robot relative to a robotic arm base of the humanoid robot at the current moment based on the robotic arm posture vector;
instructions for obtaining, a rotation matrix of the robotic arm base in the preset coordinate system at the current moment;
instructions for calculating a second motion velocity vector of the robotic arm end in the preset coordinate system at the current moment, wherein the second motion velocity vector includes a linear velocity and an angular velocity of the robotic arm end in the preset coordinate system;
instructions for obtaining a corresponding to-be-processed velocity vector by performing a speed superposition processing on the first motion speed vector and the second motion speed vector;
instructions for calculating a forward Jacobian matrix of the whole-body generalized coordinate vector relative to the actual task space vector based on the to-be-processed velocity vector and the whole-body generalized coordinate vector; and
instructions for obtaining the corresponding inverse Jacobian matrix by performing singular value decomposition on the calculated forward Jacobian matrix.

10. The motion controller of claim 9, wherein a relation of the to-be-processed velocity vector, the whole-body generalized coordinate vector, and the forward Jacobian matrix is expressed using an equation of:

$$A = J(\zeta)\dot\zeta;$$

where, A represents the to-be-processed velocity vector, $\zeta$ represents the whole-body generalized coordinate vector, $\dot\zeta$ represents a first order derivative of the whole-body generalized coordinate vector with respect to time, $J(\zeta)$ represents the forward Jacobian matrix.

11. The motion controller of claim 8, the instructions for calculating, the target generalized coordinate vector corresponding; to the to-be-executed task space vector comprise:

instructions for calculating a task vector difference vector between the to-be-executed task space vector and the actual task space vector;

instructions for calculating the null space vector corresponding to the inverse Jacobian matrix in the null space;

instructions for comparing each vector element in the whole-body generalized coordinate vector with a preset upper limit and a preset lower limit of a corresponding vector element in the one or more preset position constraints to obtain a plurality of comparison results, and generating a matching limit correction vector for the whole-body generalized coordinate vector according to all the obtained comparison results;

instructions for calculating a generalized vector compensation vector of the humanoid robot for the to-be-executed task space vector based on the inverse Jacobian matrix, the null space vector, the task vector difference vector, and the limit correction vector; and instructions for obtaining the target generalized coordinate vector by performing vector compensation on the whole-body generalized coordinate vector according to the generalized vector compensation vector.

12. The motion controller of claim 11, wherein a relation of the generalized vector compensation vector, the inverse Jacobian matrix, the null space vector, the task vector difference vector and the limit correction vector is expressed using an equation of:

$$\Delta\zeta = J^+(\zeta)\Delta\sigma + Z(\zeta)\Delta S;$$

where, $\Delta\zeta$ represents the generalized vector compensation vector, $J^+(\zeta)$ represents the inverse Jacobian matrix, $Z(\zeta)$ represents the null space vector, $\Delta\sigma$ represents the task vector difference vector, and $\Delta S$ represents the limit correction vector.

13. The motion controller of claim 8, wherein the first motion velocity vector is calculated using an equation of:

$$\begin{bmatrix} {}_{torso}^{foot}v \\ {}_{torso}^{foot}w \end{bmatrix} = \begin{bmatrix} \frac{\partial f}{\partial x} & \frac{\partial f}{\partial y} & \frac{\partial f}{\partial z} & \frac{\partial f}{\partial r_x} & \frac{\partial f}{\partial r_y} & \frac{\partial f}{\partial r_z} \\ 0 & 0 & 0 & 1 & 0 & 0 \\ 0 & 0 & 0 & 0 & 1 & 0 \\ 0 & 0 & 0 & 0 & 0 & 1 \end{bmatrix} \dot\eta^T;$$

where, ${}_{torso}^{foot}v$ represents the linear velocity of the waist relative to the feet, and ${}_{torso}^{foot}w$ represents the angular velocity of the waist relative to the feet.

14. The motion controller of claim 8, wherein the second motion velocity vector is calculated using an equation of:

$$\begin{bmatrix} {}_{tool}^{foot}v \\ {}_{tool}^{foot}w \end{bmatrix} = \begin{bmatrix} {}_{base}^{foot}R & 0 \\ 0 & {}_{base}^{foot}R \end{bmatrix} {}_{tool}^{base}J(q)\dot q;$$

where, ${}_{tool}^{foot}v$ represent the linear velocity of the end of the robotic arm relative to the feet, ${}_{tool}^{foot}w$ represents the angular velocity of the end of the robotic arm relative to the feet, ${}_{base}^{foot}R$ represents the rotation matrix of the robotic am base relative to the feet, and ${}_{tool}^{base}J(q)\dot q$ is obtained by performing derivation on the pose expression vector of the end of the robotic relative to the robotic arm base.

15. A non-transitory computer readable storage medium for storing one or more computer programs, wherein the one or more computer programs comprise:

instructions for obtaining a whole-body generalized coordinate vector, an actual task space vector and a to-be-executed task space vector of the humanoid robot at a current moment, wherein the whole-body generalized coordinate vector is composed of a waist posture vector and a robotic arm posture vector of the humanoid robot;

instructions for calculating an inverse Jacobian matrix of the whole-body generalized coordinate vector relative to the actual task space vector based on waist posture vector and the robotic arm posture vector;

instructions for calculating a target generalized coordinate vector corresponding to the to-be-executed task space vector by combining the actual task space vector and the to-be-executed task space vector into a null space of the inverse Jacobian matrix according to one or more preset position constraints corresponding to the whole-body generalized coordinate vector; and instructions for controlling a motion state of the humanoid robot according to the target generalized coordinate vector.

16. The storage medium of claim 15, wherein the instructions for calculating the inverse Jacobian matrix of the whole-body generalized coordinate vector relative to the actual task space vector comprise:

instructions for calculating a first motion velocity vector of a waist part of the humanoid robot in a preset coordinate system of the humanoid robot at the current moment based on the waist posture vector, wherein the first motion velocity vector includes a linear velocity and an angular velocity of the waist in the preset coordinate system, wherein the preset coordinate system has a center point between two feet of the humanoid robot touching a plane as an origin;

instructions for determining a pose expression vector of a robotic arm end of the humanoid robot relative to a robotic arm base of the humanoid robot at the current moment based on the robotic arm posture vector;

instructions for obtaining a rotation matrix of the robotic arm base in the preset coordinate system at the current moment;

instructions for calculating a second motion velocity vector of the robotic arm end in the preset coordinate system at the current moment, wherein the second motion velocity vector includes a linear velocity and an angular velocity of the robotic arm end in the preset coordinate system;

instructions for obtaining a corresponding to-be-processed velocity vector by performing a speed superposition processing on the first motion speed vector and the second motion speed vector;

instructions for calculating a forward Jacobin matrix of the whole-body generalized coordinate vector relative to the actual task space vector based on the to-be-processed velocity vector and the whole-body generalized coordinate vector; and instructions for obtaining the corresponding inverse Jacobian matrix by performing singular value decomposition on the calculated forward Jacobian matrix.

17. The storage medium of claim 16, wherein a relation of the to-be-processed velocity vector, the whole-body generalized coordinate vector, and the forward Jacobian matrix is expressed using an equation of:

$$A = J(\zeta)\dot{\zeta};$$

where, A represents the to-be-processed velocity vector, $\zeta$ represents the whole-body generalized coordinate vector, $\dot{\zeta}$ represents a first order derivative of the whole-body generalized coordinate vector with respect to time J($\zeta$) represents the forward Jacobian matrix.

18. The storage medium of claim 15, the instructions for calculating the target generalized coordinate vector corresponding to the to-be-executed task space vector comprise:

instructions for calculating a task vector difference vector between the to-be-executed task space vector and the actual task space vector;

instructions for calculating the null space vector corresponding to the inverse Jacobian matrix in the null space;

instructions for comparing each vector element in the whole-body generalized coordinate vector with a preset upper limit and a preset lower limit of a corresponding vector element in the one or more preset position constraints to obtain a plurality of comparison results, and generating a matching limit correction vector for the whole-body generalized coordinate vector according to all the obtained comparison results;

instructions for calculating a generalized vector compensation vector of the humanoid robot for the to-be-executed task space vector based on the inverse Jacobian matrix, the null space vector, the task vector difference vector, and the limit correction vector; and instructions for obtaining the target generalized coordinate vector by performing vector compensation on the whole-body generalized coordinate vector according to the generalized vector compensation vector.

19. The storage medium of claim 18, wherein a relation of the generalized vector compensation vector, the inverse Jacobian matrix, the null space vector, the task vector difference vector and the limit correction vector is expressed using an equation of:

$$\Delta\zeta = J^{\dagger}(\zeta)\Delta\sigma + Z(\zeta)\Delta S;$$

where, $\Delta\zeta$ represents the generalized vector compensation vector, $J^{\dagger}(\zeta)$ represents the inverse Jacobian matrix, $Z(\zeta)$ represents the null space vector, $\Delta\sigma$ represents the task vector difference vector, and $\Delta S$ represents the limit correction vector.

20. The storage medium of claim 15, wherein the first motion velocity vector is calculated using an equation of:

$$\begin{bmatrix} {}^{foot}_{torso}v \\ {}^{foot}_{torso}w \end{bmatrix} = \begin{bmatrix} \frac{\partial f}{\partial x} & \frac{\partial f}{\partial y} & \frac{\partial f}{\partial z} & \frac{\partial f}{\partial r_x} & \frac{\partial f}{\partial r_y} & \frac{\partial f}{\partial r_z} \\ 0 & 0 & 0 & 1 & 0 & 0 \\ 0 & 0 & 0 & 0 & 1 & 0 \\ 0 & 0 & 0 & 0 & 0 & 1 \end{bmatrix} \dot{\eta}^T;$$

where, ${}^{foot}_{torso}v$ represents the linear velocity of the waist relative to the feet, and ${}^{foot}_{torso}w$ represents the angular velocity of the waist relative to the feet.

* * * * *